H. B. SHERWOOD.
Hand Weeders.
No. 134,224.                          Patented Dec. 24, 1872.
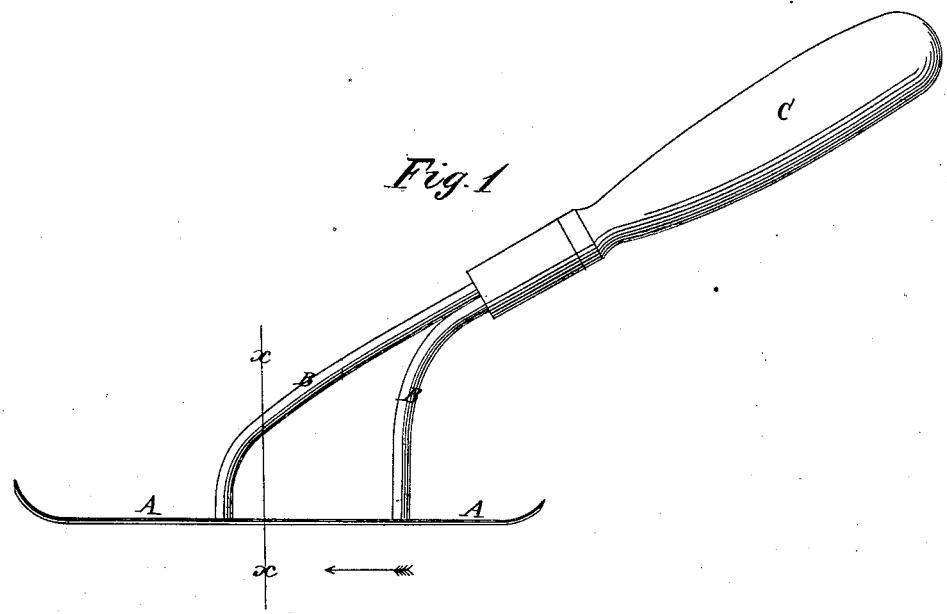
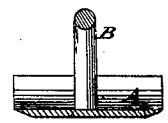
Witnesses:  
N. W. Almqvist  
C. Sedgwick  
Inventor:  
H. B. Sherwood  
per Munn & Co  
Attorneys.

UNITED STATES PATENT OFFICE.

HENRY B. SHERWOOD, OF WESTPORT, CONNECTICUT.

IMPROVEMENT IN HAND-WEEDERS.

Specification forming part of Letters Patent No. 134,224, dated December 24, 1872.

*To all whom it may concern:*

Be it known that I, HENRY B. SHERWOOD, of Westport, in the county of Fairfield and State of Connecticut, have invented a new and useful Improvement in Hand-Weeder, of which the following is a specification:

In the accompanying drawing, Figure 1 is a side view of my improved hand-weeder. Fig. 2 is a detail cross-section of the same taken through the line $x\ x$, Fig. 1, looking in the direction of the arrow.

Similar letters of reference indicate corresponding parts.

My invention has for its object to furnish a simple, convenient, and effective implement for weeding onions and other garden-plants; and it consists in the construction and combination of the various parts, as hereinafter more fully described.

A is the blade of the weeder, which is a thin and narrow steel plate, the side and end edges of which are beveled off upon their lower sides, as shown in Figs. 1 and 2. The ends of the blade A are slightly curved upward, as shown in Fig. 2. This construction enables either end of the blade A to be used as may be convenient for removing weeds growing between or close to the sides of the plants. This construction also enables the weeder to be used for loosening the soil close to the plants without danger of cutting off or injuring said plants.

B are the shanks, which are two rods, the lower ends of which are inserted and riveted in holes formed at a little distance apart in the middle part of the plate A. The rods B project upward, are curved to the rearward, and their ends are brought together and inserted in a handle, C.

In case a single shank, B, were used, its lower end would have to be made square and riveted in a square hole in the plate A, or secured by two rivets. By using the two shanks, B, the plate A will be held firmly, so that it may be used in any desired manner without danger of the plate or blade A getting out of place. The two shanks, B, also serve to break up and loosen the soil when the blade A is moved along laterally beneath its surface.

Having thus described my invention, I claim as new and desire to secure by Letters Patent—

As an improved article of manufacture, a hand-weeder, consisting of the two shanks B, the handle C, and the thin narrow steel plate A, having beveled edges and turned-up ends, substantially as shown and described.

HENRY B. SHERWOOD.

Witnesses:
 MOSES W. WILSON,
 JOHN W. TAYLOR.